(12) United States Patent
Su (10) Patent No.: US 10,279,871 B2
(45) Date of Patent: May 7, 2019

(54) OFFSHORE FACILITY WITH METAL PROCESSING APPARATUS AND POWER GENERATION SYSTEM

(71) Applicant: TMT PTE. LTD, Alexandra Terrace (SG)

(72) Inventor: Hsin Chi Su, Taipei (TW)

(73) Assignee: TMT PTE. LTD., Singapore (SG)

(*) Notice: Subject to any disclaimer, the term of this patent is extended or adjusted under 35 U.S.C. 154(b) by 579 days.

(21) Appl. No.: 14/769,571

(22) PCT Filed: Jan. 27, 2014

(86) PCT No.: PCT/SG2014/000032
§ 371 (c)(1),
(2) Date: Aug. 21, 2015

(87) PCT Pub. No.: WO2014/116185
PCT Pub. Date: Jul. 31, 2014

(65) Prior Publication Data
US 2015/0375832 A1    Dec. 31, 2015

Related U.S. Application Data

(60) Provisional application No. 61/756,581, filed on Jan. 25, 2013.

(51) Int. Cl.
*B63B 35/44* (2006.01)
*F03D 1/02* (2006.01)
(Continued)

(52) U.S. Cl.
CPC ............... *B63B 35/44* (2013.01); *C22B 9/16* (2013.01); *F02C 3/22* (2013.01); *F03D 1/02* (2013.01);
(Continued)

(58) Field of Classification Search
CPC ........ B63B 2035/444; B63B 2035/446; B63B 2035/4433; B63B 2035/4473;
(Continued)

(56) References Cited

U.S. PATENT DOCUMENTS 7,302,903 B1 * 12/2007 Behrens .................. B63B 35/44
114/264
7,685,804 B2 * 3/2010 Evulet ...................... F02K 1/28
60/39.5
(Continued)

FOREIGN PATENT DOCUMENTS

DE    10048789 A1    4/2002
EP     2634079 A1    9/2013
(Continued)

OTHER PUBLICATIONS

Search Report in International Application No. PCT/SG2014/000032 dated Mar. 14, 2014.
International Preliminary Report on Patentability in International Application No. PCT/SG2014/000032 dated May 19, 2014.

*Primary Examiner* — Gerald L Sung
*Assistant Examiner* — Alain Chau
(74) *Attorney, Agent, or Firm* — Marshall, Gerstein & Borun LLP (57) ABSTRACT

The present invention relates broadly to a offshore facility. The offshore facility comprise a floating platform; a metal processing apparatus disposed on the floating platform; and a power management module adapted to manage and provide a stable power supply to the metal processing apparatus.

10 Claims, 11 Drawing Sheets

(51) Int. Cl.
*F03D 9/25* (2016.01)
*F03D 13/25* (2016.01)
*F03D 9/00* (2016.01)
*C22B 9/16* (2006.01)
*F02C 3/22* (2006.01)
*H02J 3/46* (2006.01)
*F03D 80/00* (2016.01)
*F02C 6/18* (2006.01)

(52) U.S. Cl.
CPC ............... *F03D 9/00* (2013.01); *F03D 9/25* (2016.05); *F03D 13/25* (2016.05); *F03D 80/00* (2016.05); *H02J 3/46* (2013.01); *B63B 2035/444* (2013.01); *B63B 2035/446* (2013.01); *B63B 2035/4473* (2013.01); *F02C 6/18* (2013.01); *F05B 2240/93* (2013.01); *F17C 2227/0311* (2013.01); *F17C 2227/0318* (2013.01); *F17C 2227/0323* (2013.01); *F17C 2265/05* (2013.01); *F17C 2265/07* (2013.01); *F17C 2270/0121* (2013.01); *Y02E 10/725* (2013.01); *Y02E 10/727* (2013.01); *Y02E 20/16* (2013.01)

(58) Field of Classification Search
CPC ....... Y02E 20/16; Y02E 20/18; Y02E 10/725; Y02E 10/727; F02C 6/18; F02C 3/22; F03D 13/25; F03D 1/02; F05B 2240/93; H02J 3/46; C22B 9/16; F17C 2227/0311; F17C 2227/0318; F17C 2227/0323; F17C 2227/0121; F17C 2265/05; F17C 2265/07
See application file for complete search history.

(56) References Cited

U.S. PATENT DOCUMENTS

| | | | | |
|---|---|---|---|---|
| 8,171,732 | B2* | 5/2012 | Evulet | F02B 37/02 60/614 |
| 8,308,518 | B1* | 11/2012 | Shivers, III | B63B 21/50 114/230.14 |
| 2002/0182946 | A1* | 12/2002 | Tanaka | B63B 35/44 440/6 |
| 2005/0005832 | A1 | 1/2005 | Uittenbogaard | |
| 2005/0061002 | A1 | 3/2005 | Nierenberg | |
| 2006/0260315 | A1 | 11/2006 | Park | |
| 2007/0214806 | A1* | 9/2007 | Faka | F17C 5/06 62/50.2 |
| 2009/0189123 | A1* | 7/2009 | Gueh | B09B 3/00 252/373 |
| 2010/0034642 | A1* | 2/2010 | Evulet | F02K 1/28 415/117 |
| 2010/0270807 | A1* | 10/2010 | Manning | F02C 6/18 290/55 |
| 2014/0044541 | A1 | 2/2014 | Dupin De La Gueriviere | |

FOREIGN PATENT DOCUMENTS

| | | |
|---|---|---|
| GB | 1346684 A | 2/1974 |
| JP | 11-013421 | 1/1999 |
| JP | 2007331681 A | 12/2007 |
| WO | WO-2007/037763 A2 | 4/2007 |
| WO | WO-2007/104076 A1 | 9/2007 |
| WO | WO-2009/108134 A1 | 9/2009 |
| WO | WO-2010/131979 A1 | 11/2010 |
| WO | WO-2011/040656 A1 | 4/2011 |
| WO | WO-2012/030042 A1 | 3/2012 |
| WO | WO-2012/066223 A1 | 5/2012 |

\* cited by examiner

OFFSHORE FACILITY WITH METAL PROCESSING APPARATUS AND POWER GENERATION SYSTEM

CROSS-REFERENCE TO RELATED APPLICATIONS

This application is the U.S. national phase under 35 U.S.C. § 371 of International Application No. PCT/SG2014/000032 filed Jan. 27, 2014, entitled "Offshore Facility", which claims the priority of U.S. Application No. 61/756,581 filed Jan. 25, 2013, the entire disclosure of which is incorporated herein by reference.

FIELD OF INVENTION

The present invention relates broadly to an offshore facility.

BACKGROUND

Conventionally, certain types of industrial plants and factories are known to consume high amount of electrical power, which may possibly cause disruption to the power supply on the land based grid, and also produce significant amount of pollution as a by-product. Some examples of such plants and factories include metal processing facilities, scrap metal processing facilities, refineries etc.

It is also known that land-based power generation by burning coal, natural gas or petroleum is inefficient and produces emissions that may be harmful and/or may cause pollution in areas near the power plant. Danger of explosion or risk of fire to the storage facilities of these flammable substances is also a concern when these land-based power generation facilities are located near populated areas. With regard to hydroelectric dams, wind turbines and solar power, the challenge lies in finding a geographical location that is able to harness these natural forces and yet close enough to transmit the harnessed power to the grid. For example, for land based wind power generation, it is known that coastal shoreline are suitable for setting up wind turbines because coastal wind are rather consistent and has an average wind speed of between 4 m/s to 18 m/s. However, usable coastal shorelines are typically limited and/or may be located over a large distance away from the grid, thus resulting in significant transmission losses. With regards to nuclear power, handling of nuclear waste and/or the danger of a nuclear leak is always a concern.

A need therefore exists to address at least some of the above problems.

SUMMARY

According to an aspect, there is provided an offshore facility comprising a floating platform; a metal processing apparatus disposed on the floating platform; and a power management module adapted to manage and provide a stable power supply to the metal processing apparatus.

The offshore facility may further comprise a power generation system adapted to supply power to the metal processing apparatus.

The power generation system may comprise a plurality of wind turbines.

The power generation system may comprise at least one gas turbine generator.

The power generation system may comprise a combination of a plurality of wind turbines and at least one gas turbine generator.

The offshore facility may further comprise a substation for consolidating the power output from the power generation system.

The offshore facility may further comprise a LNG regasification system.

The LNG regasification system may comprise a shell and tube vaporizer for heat exchange between the LNG and an intermediate fluid.

The LNG regasification system may further comprise a plurality of air fan heaters for heat exchange between the intermediate fluid and ambient air.

An exhaust gas from the gas turbine generator may be directed to the intermediate fluid for heat exchange between the exhaust and the intermediate fluid.

The offshore facility may further comprise an exhaust air blower system for directing an exhaust gas from the gas turbine generator towards the plurality of wind turbines.

The offshore facility may further comprise a mooring system.

The mooring system may be configured to transmit electrical power from the offshore facility to another location.

The mooring system may be further configured to supply gas to another location.

The mooring system may be a turret mooring system.

The metal processing apparatus may be adapted to melt the metal.

BRIEF DESCRIPTION OF DRAWINGS

Embodiments of the invention will be better understood and readily apparent to one of ordinary skill in the art from the following written description, by way of example only, and in conjunction with the drawings, in which.

DETAILED DESCRIPTION

Figure 1:
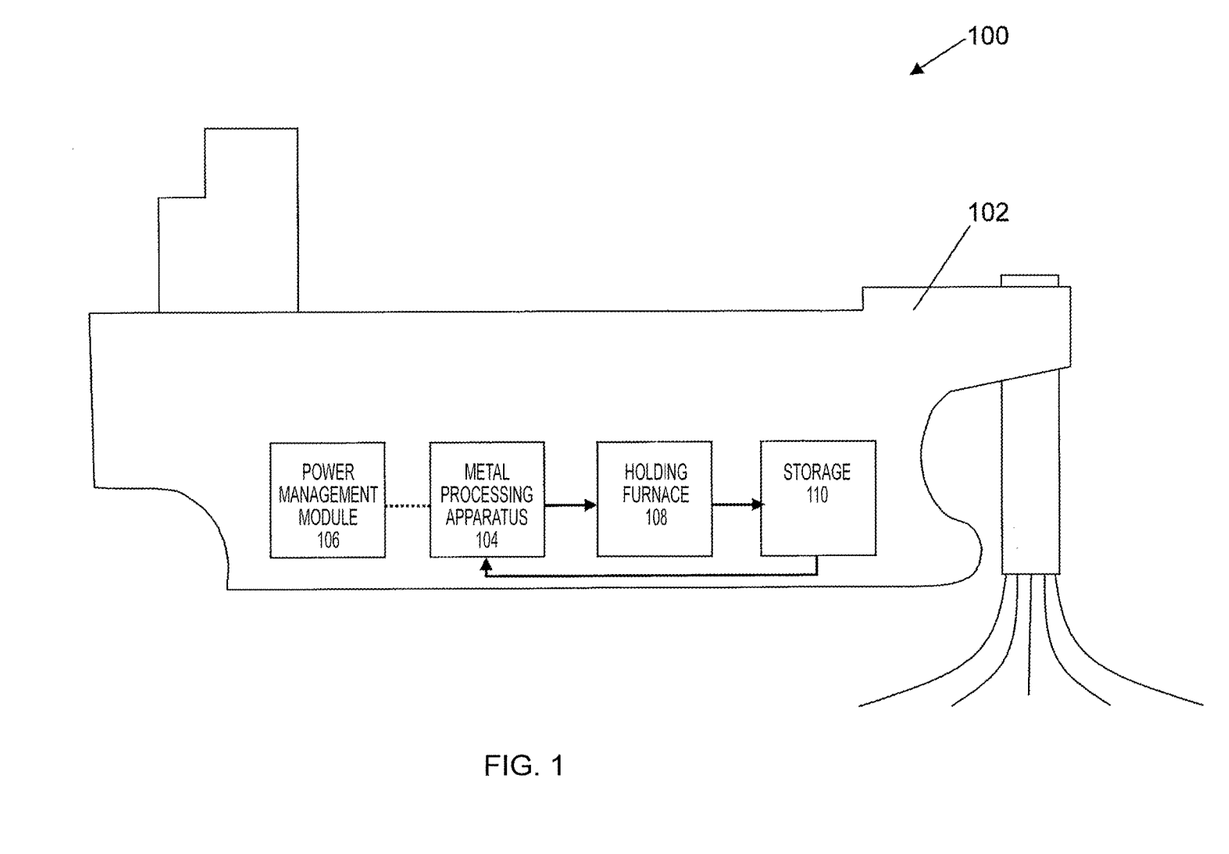
FIG. 1 schematically illustrates a floating offshore facility according to an example embodiment.

FIG. 1 schematically illustrates a floating offshore facility 100 according to an example embodiment. The offshore facility 100 includes a floating platform 102. The offshore facility 100 may be fitted with apparatus 104 that form part of an offshore industrial processing plant or factory. In an example, the apparatus 104 may be metal processing apparatus 104 adapted to process metal, or to process scrap metal etc. It will be appreciated that the apparatus of the industrial processing plant or factory may require a stable supply of electrical power to ensure continuous effective production. However, in an offshore environment, depending on the type of electrical power generation system supplying electrical power to the offshore facility, the power supply may be erratic or unstable. The configuration shown in FIG. 1 further includes a power management module 106 adapted to manage and provide a stable power supply to the apparatus 104. It is understood that the power management module 106 may be of any type and may be located anywhere as long as it is able to manage the power supplied to the apparatus 104.

As shown in FIG. 1, the floating platform 102 is in the shape of a vessel. The floating platform 102 may be an existing vessel converted for use or new vessel built for the specific purpose. It is understood that floating platform 102 may also be in the form of barges or other floating platform configurations customized for the purpose.

The processing plant on the offshore facility 100 may be configured to process steel or aluminum scrap metal. In this configuration, the steel or aluminum scrap metal processing plant may include metal processing apparatus 104 adapted to melt the steel or aluminum scrap metal. Pre-treated steel or aluminum scrap metal, which has been separated from foreign materials and shredded into appropriate size for handling, may be delivered directly to the offshore facility 100. Loading equipment may load the steel or aluminum scrap metal into a storage 110 on the offshore facility 100.

To melt the steel or aluminum scrap metal, the metal processing apparatus 104 may include an electric furnace. The steel or aluminum scrap metal may be fed into the electric furnace for melting down into molten metal. The molten metal may then be transferred to a holding furnace 108 in which the chemical composition of the molten metal is adjusted and controlled to the specified composition required. A quality control module may be incorporated to monitor and control the chemical composition, cleanliness and consistency of the molten metal throughout the entire process. At the final phase of the process, the molten metal may be casted into ingots by casting equipment or further processed into plates or bars by extrusion equipment etc. The final product is then stored in the storage 110 prior being unloaded from the offshore facility 100.

In an example implementation, the electric furnace may be required to be heated up to about 950° C. to melt aluminum scrap when processing aluminum scrap. In another example implementation, the electric furnace may be required to be heated up to about 1500° C. to melt steel scrap when processing steel scrap. It will be appreciated that the operation of such furnace may cause flicker and harmonic distortion on a power system if the power is drawn from a land based grid. This may cause disruption to other users on the same grid. Advantageously, by moving the electric furnace to an offshore facility and isolating the electric furnace from a land based grid, the problem associated with disruption caused by electric furnace operation may be eliminated.

In another embodiment, the offshore facility 100 may include other apparatus required for processing raw scrap metal. For example, in addition to the metal processing apparatus 104, the offshore facility 100 may include a separation apparatus for treating the raw steel or aluminum scrap metal to separate foreign materials from the raw steel or aluminum scrap metal. The offshore facility 100 may further include a shredding apparatus to shred the raw steel or aluminum scrap metal into an appropriate size for subsequent handling. In this configuration, raw steel or aluminum scrap metal may be delivered directly to the offshore facility 100.

In an implementation, the production line of the apparatus for processing scrap metal to produce ingots, plates or bars may be layout in a series manner such that it is approximately 400 m in length. In this case, the floating platform 102 may be 450 m in length or more to accommodate this layout.

In an embodiment, ballast tanks and void tanks are arranged and layout in the offshore facility 100 such that the apparatus for processing scrap metal are shielded within these ballast tanks and void tanks, which act as fire hazard barriers or blast shield, to ensure the safety and stability of the offshore facility 100.

Figure 2:
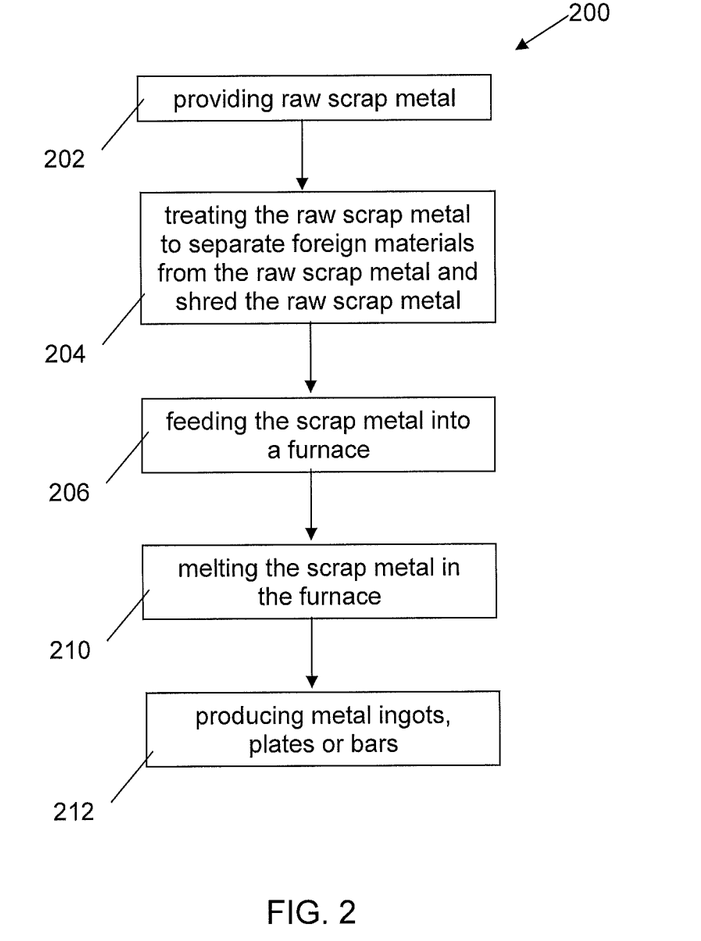
FIG. 2 illustrates a flow diagram of a method of metal processing incorporated on an offshore facility according to an example embodiment.

FIG. 2 illustrates a flow diagram 200 of a method of metal processing incorporated on an offshore facility according to an example embodiment. At step 202, raw scrap metal is provided. At step 204, the raw scrap metal is treated such that foreign materials are separated from the raw scrap metal and the raw scrap metal is shred. At step 206, the treated scrap metal is fed into a furnace. At step 210, the furnace is heated up to melt the scrap metal. At step 212, the metal ingots, plates or bars are produced from the metal processing. Advantageously, having metal processing in an offshore arrangement may remove or isolate the power supply issues and pollution associated with metal processing from the populated areas.

It will be appreciated that to supply electrical power to the apparatus 104 on the offshore facility 100, power generation systems are required. The power generation systems may be co-located with the apparatus 104 on the same floating platform 102 of the offshore facility 100. In another embodiment, the power generation systems may be located on a separate floating platform adjacent to the floating platform 102 with the apparatus 104. Electrical power may be transmitted from the power generation systems to the floating platform 102 with the apparatus 104 via underwater cables.

Figure 3:
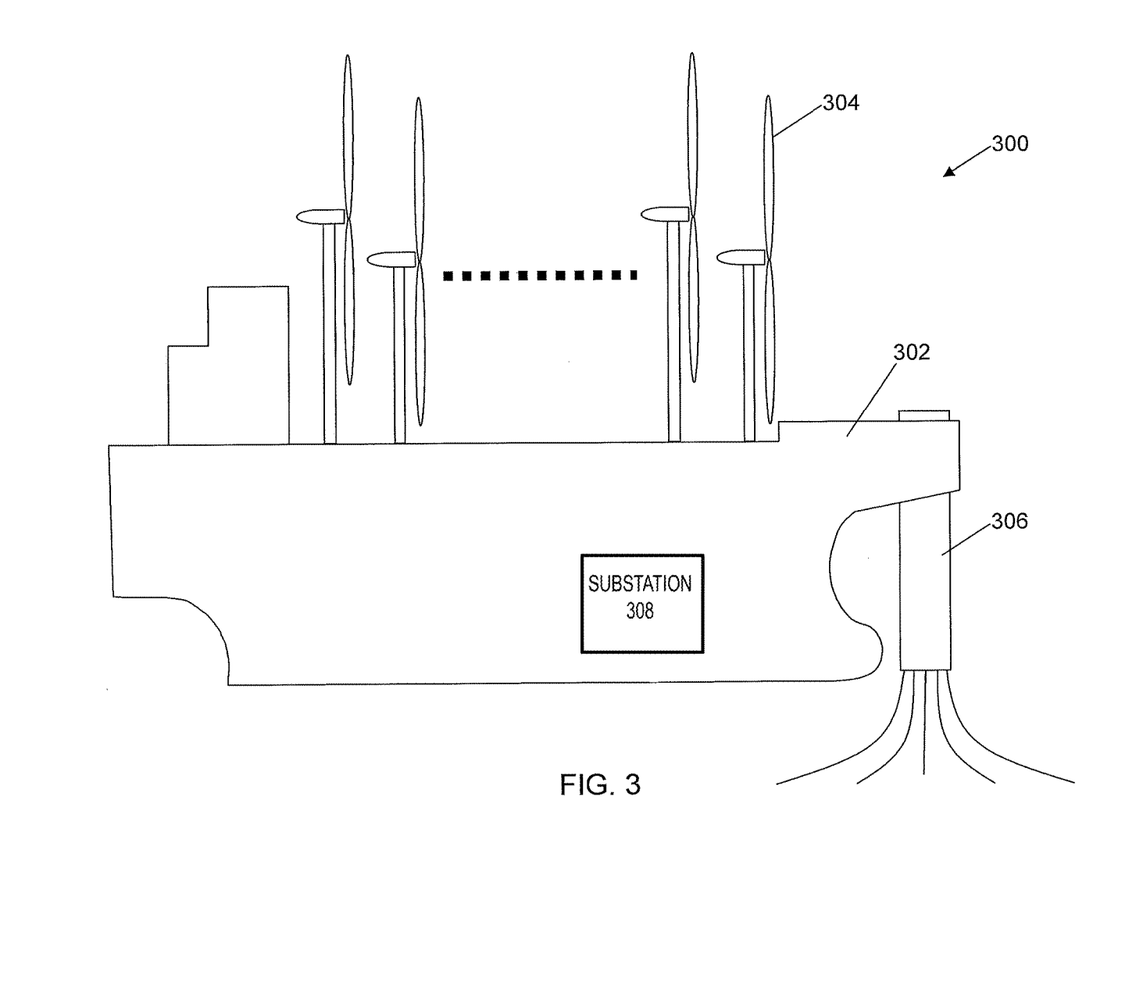
FIG. 3 schematically illustrates a floating offshore facility with power generation systems according to an example embodiment.

FIG. 3 illustrates a floating offshore facility 300 with power generation systems. The offshore facility 300 with power generation systems includes a floating platform 302 with a plurality of wind turbines 304. The floating platform 302 as shown is in the shape of a vessel. The floating platform 302 may be an existing vessel converted for use or new vessel built for the specific purpose. It is understood that floating platform 302 may also be in the form of barges or other floating platforms customized for the purpose.

As shown in FIG. 3, the plurality of wind turbines 304 is disposed along the deck of the floating platform 302. In an embodiment, each of the wind turbine 304 may be 80 m tall with 50 m turbine blades. The wind turbine may be of a two-blades wind turbine system, a three-blades wind turbine system, or a vertical-axis wind turbine system. It is understood that the types of wind turbines 304 may vary. The above is provided by way of an example only.

In an embodiment, the plurality of wind turbines 304 may be spaced adequately. For example, each of the plurality of wind turbines 304 may be spaced apart from an adjacent one by about 80 m.

It is understood that the spacing of the wind turbines above is provided by way of an example only. Other spacing may be possible.

It is also understood that ballast tanks are sufficiently provided and arranged in the floating platform 302 to ensure the stability of the floating platform 302.

Figure 4:
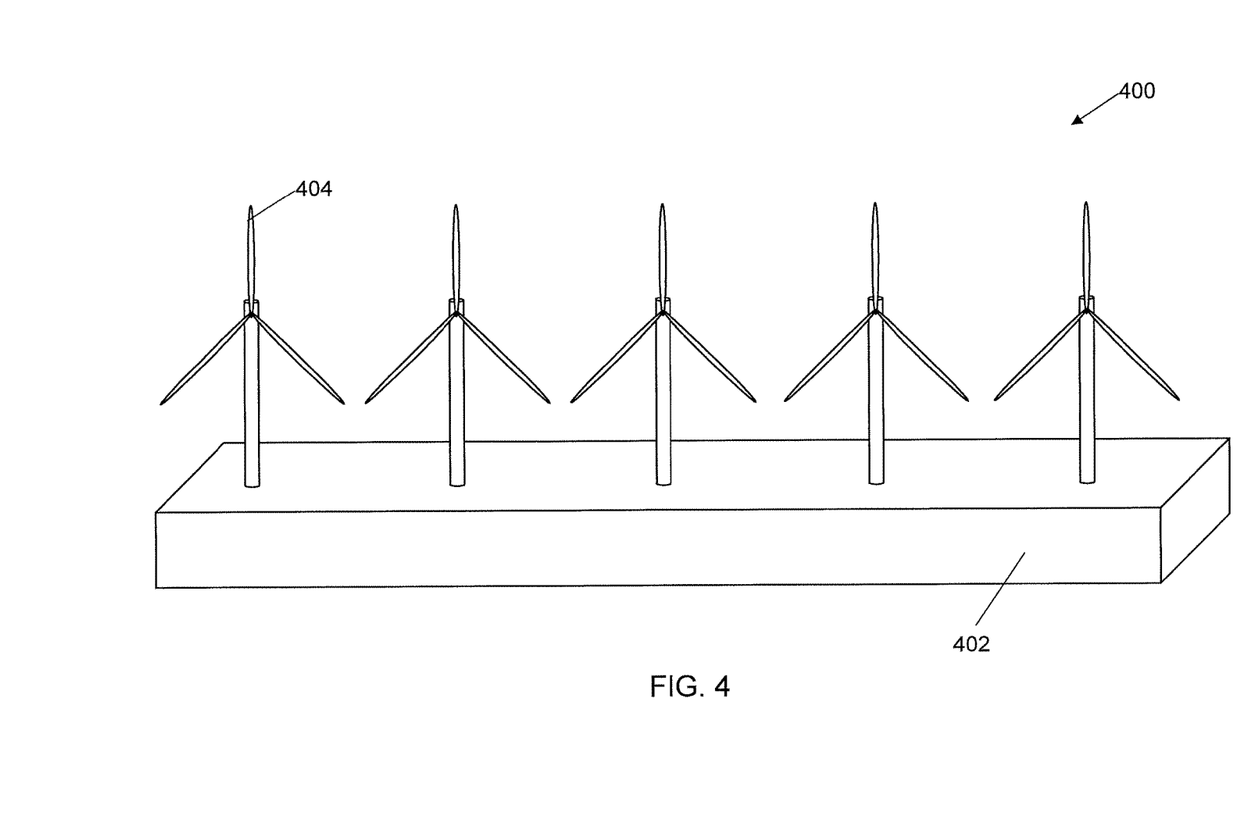
FIG. 4 schematically illustrates a floating offshore facility with wind power generation systems according to an example implementation.

FIG. 4 illustrates a floating offshore facility with wind power generation systems according to an example implementation. The offshore facility 400 with wind power generation systems includes a floating platform 402 with five wind turbines 404. The floating platform 402 may be approximately 50-70 m wide, 500 m long and 30 m high. Each of the wind turbines 404 may be 80 m tall with 50 m turbine blades. Each wind turbine 404 may be spaced apart from the adjacent one by about 80 m. In this implementation, each wind turbine 404 may generate approximately 2500 kW to 3000 kW of electrical power. The total electrical power generated by the offshore facility 400 with wind power generation may be approximately 12.5 MW to 15 MW. Ballast tanks may be provided within the floating platform 402 such that the floating offshore facility with wind power generation 400 may be stabilized in the offshore environment.

In an embodiment, the plurality of wind turbines 304 may be arranged such that the height of consecutive wind turbines varies. For example, the first wind turbine may be 70 m tall, and the second wind turbine may be 80 m tall. Subsequently, the height for the rest of the plurality of wind turbines 304 will alternate between 70 m and 80 m. The effect of alternating the height of the wind turbines is for each subsequent wind turbine to have direct interaction with the wind and to reduce the effect of turbulence flow from a previous wind turbine. It is understood that the variation in height as discussed is provided by way of an example only. Other variations may be possible.

Figure 5:
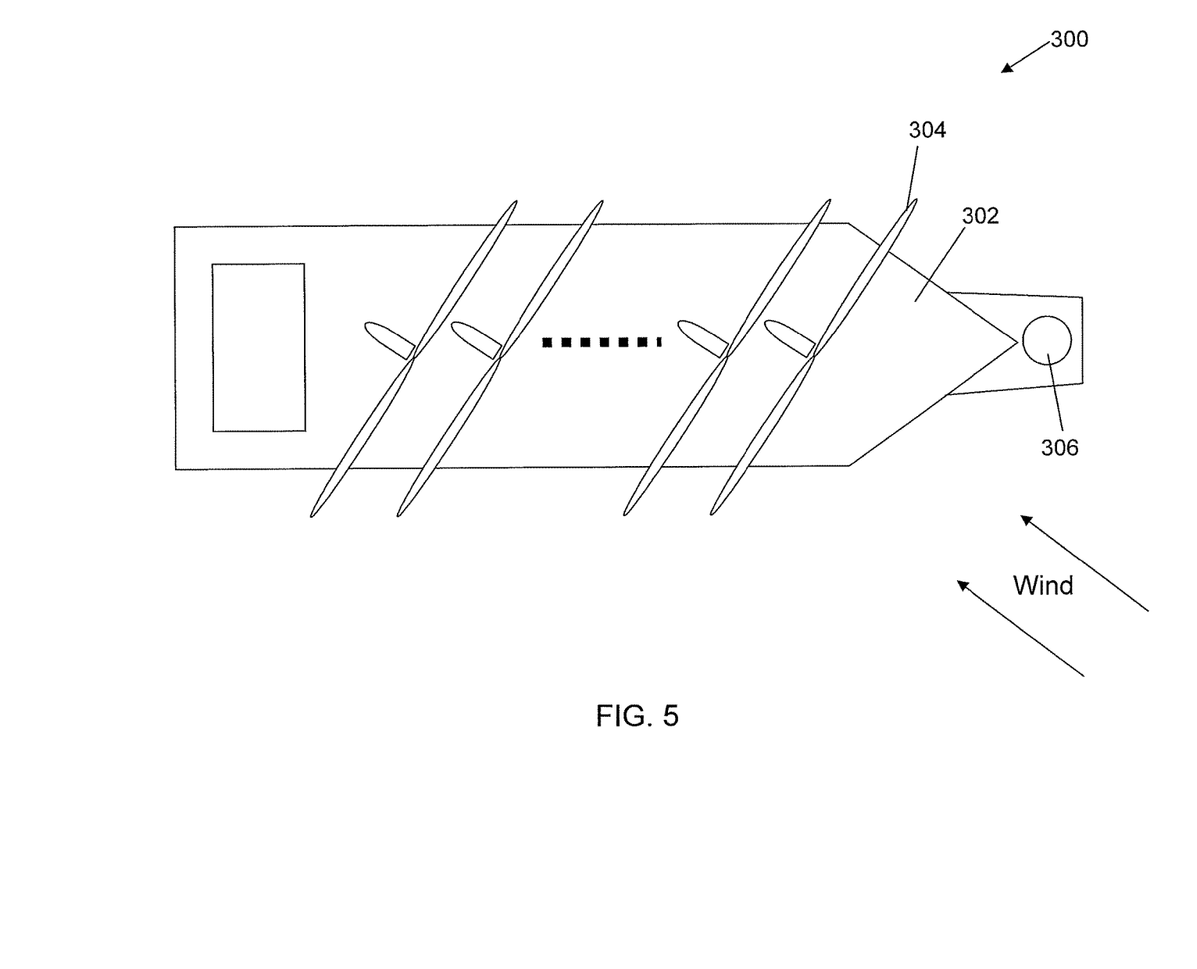
FIG. 5 schematically illustrates the top view of the floating offshore facility with power generation as illustrated in FIG. 3.

In an embodiment, the plurality of wind turbines 304 may be fixed relative to the floating platform 102. For example, the plurality of wind turbines 304 may be fixed such that they are always facing forward of the floating platform 302. The floating platform 302 may be turned to provide maximum exposure to the wind. In another embodiment, the plurality of wind turbines 304 may be rotatable such that they may turn about a vertical axis. In this embodiment, the plurality of wind turbines 304 may be turned together about their respective vertical axes to the direction of prevailing wind in a synchronized manner as the wind changes direction, for the plurality of wind turbines 304 to have maximum exposure to the prevailing wind. As shown in FIG. 5, the plurality of wind turbines 304 may turn together about their respective vertical axes to face the prevailing wind which is blowing across the offshore facility 300 at an angle. The control and method of the turning the plurality of wind turbines about their respective vertical axes may be via a centralized computerized control system or may be manual local control. It is understood that other control and method for the turning about the vertical axis is possible.

As shown in FIG. 3, the offshore facility 300 includes a mooring system 306. The mooring system 306 may be an external turret mooring system, internal turret mooring system or any other mooring system known in the art. With the turret mooring system 306, the offshore facility 300 is able to rotate about the turret. Therefore, depending on the direction of the prevailing wind, the offshore facility 300 may be rotated about the turret via thrusters or other propulsion mechanism such that the plurality of wind turbines 304 may be exposed to the maximum amount of wind for optimum power generation.

In an embodiment, the combination of the rotating wind turbines, the turret mooring system, and the propulsion systems allow the offshore facility 300 to be able to constantly harness the optimum amount of wind power. This is achieved via rotating the offshore facility 300 about the turret and rotating each wind turbines as described above.

In an embodiment, the offshore facility 300 may include azimuth thruster. The azimuth thruster may rotate about a vertical axis in which it is mounted, allowing the thruster to apply thrust in any direction about the vertical axis. This enable the offshore facility 300 to finely adjust its position and aids the offshore facility 300 to position itself such that the plurality of wind turbines 304 may be exposed to the maximum amount of wind for optimum power generation.

As shown in FIG. 3, the offshore facility 300 also includes a substation 308 for consolidating the power generated from the plurality of wind turbines 304 for subsequent onboard usage or for transmission to another floating platform. The substation 308 may also be configured to step up/down voltage suitable for subsequent usage or for transmission to the onshore power grid. The substation 308 may include metering devices and control system for monitoring and controlling the supply of electrical power from the plurality of wind turbines 304 to the substation 308. The substation 308 may also function as the power management module 106. The substation 308 may be configured to ensure a stable supply of power output.

In an embodiment, the power output from the substation 308 may be transmitted to another location. In this configuration, the turret mooring system 306 may be configured to connect with underwater cables for transmission of power consolidated in the substation 308 to another location. Electrical power and control swivels, and electrical connectors may be included in the turret mooring system 306 to facilitate the connection of the underwater cables to the turret mooring system 306 for power transmission.

Figure 6A:
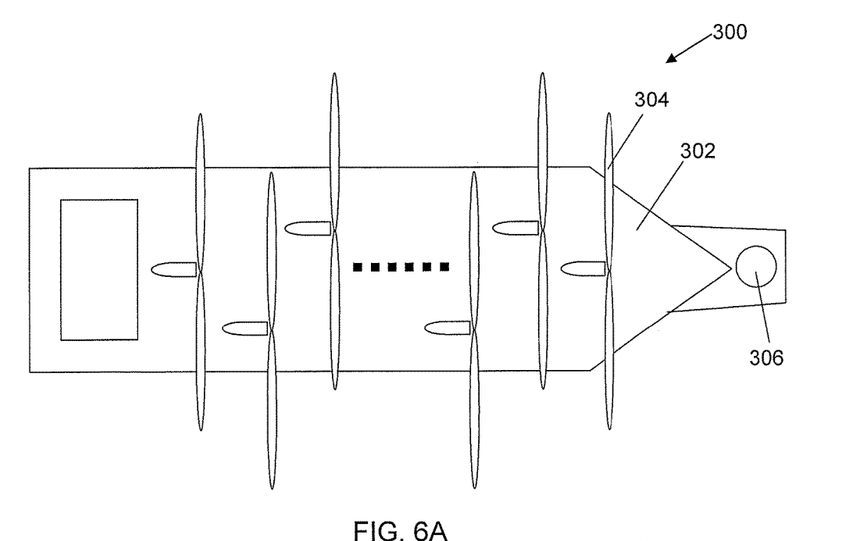
FIGS. 6A and 6B illustrate different arrangements of wind turbines on the floating offshore facility with power generation as illustrated in FIGS. 3 and 5.
Figure 6B:
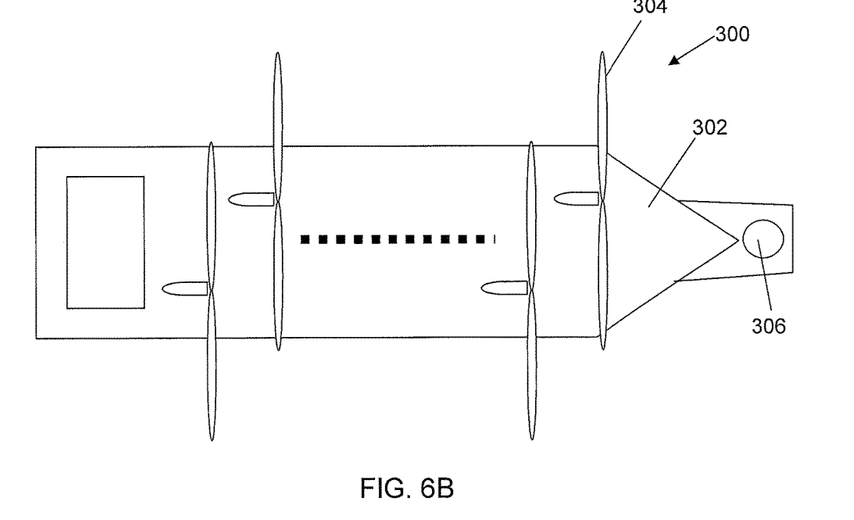

Other arrangements of the plurality of wind turbines 304 may also be possible. In FIG. 6A, the first and the last wind turbines may be on the center line of the floating platform 302. The remaining wind turbines may be disposed in an alternating manner on each side of the floating platform 302. In FIG. 6B, the plurality of wind turbines 304 may be disposed in an alternating manner on each side of the floating platform 302.

It is understood that the plurality of wind turbines 304 may be vertical-axis wind turbines. The vertical-axis wind turbines may include vertical blades or helical twisted blades. The number, size, disposition and type of vertical-axis wind turbines mounted on the floating platform 302 may vary depending on the amount of power output required.

Advantageously, the offshore facility 300 of the example embodiments and implementation may be mobile and portable such that they can be easily moved to coastal areas where there is a scarcity of power and/or eliminate the problem of encountering periods of no wind for wind power generation. The use of wind power generation systems to supply electrical power for offshore facility with processing plants or factories may also enhance the power efficiency of such plants or factories. In the embodiment in which the offshore facility is for scrap metal processing, the use of wind power generation systems may add to the energy saving of metal recycling.

In another embodiment, the offshore facility 300 may include a gas turbine power generation system (without the wind turbines 304) as the power source for the offshore facility 300. In another embodiment, the offshore facility with power generation 300 may include a gas turbine power generation system in addition to the plurality of wind turbines 304 to augment the power output of the offshore facility 300.

Figure 7:
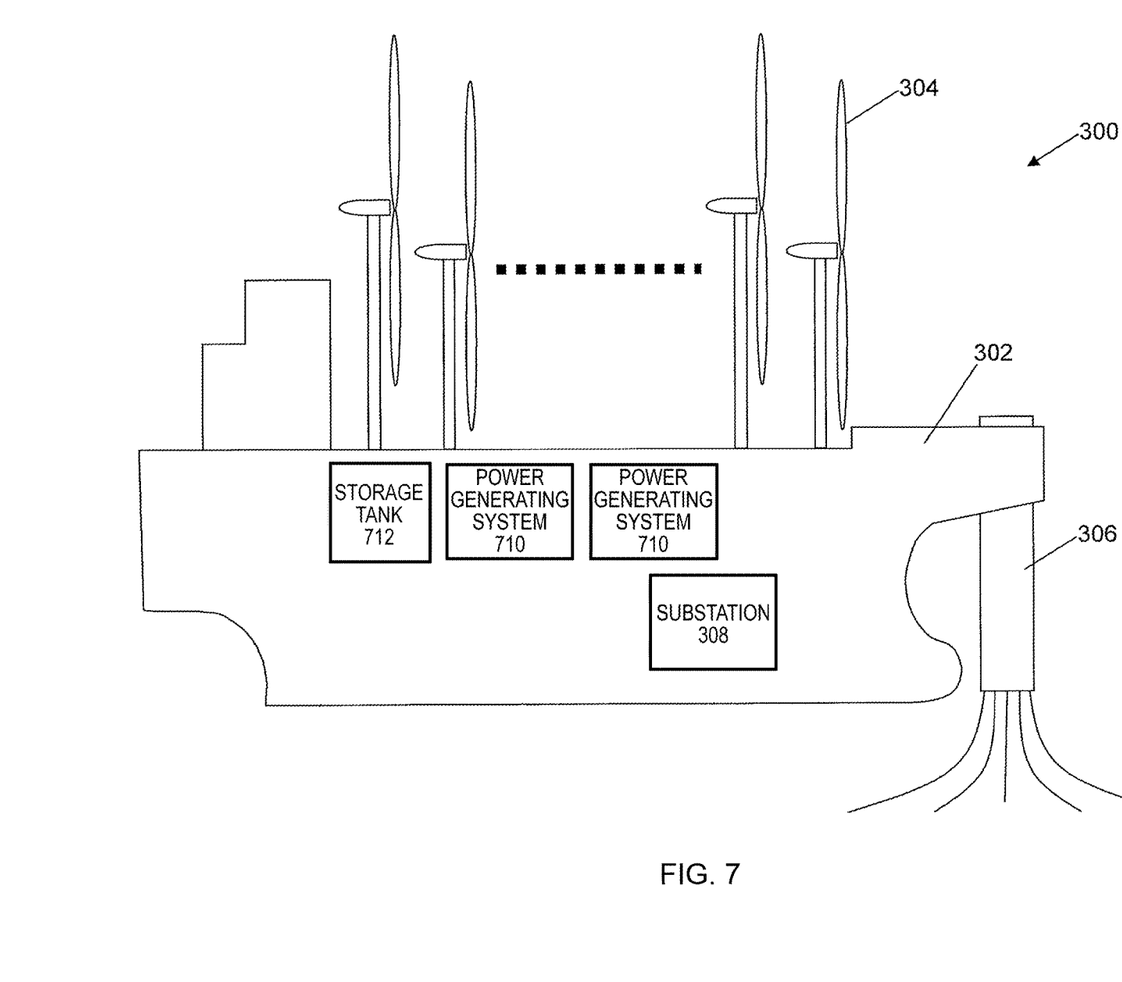
FIGS. 7-11 schematically illustrate the side view of a floating offshore facility with power generation according other example embodiments.

FIG. 7 shows an offshore facility 300 with a gas turbine power generation system 710 in addition to the plurality of wind turbines 304 to augment the power output of the offshore facility 300. As shown in FIG. 7, the offshore facility 300 includes gas turbine power generation system 710 disposed within the floating platform 302. It is understood that FIG. 7 is provided by way of an example only. The gas turbine power generation system 710 may also be disposed, for example, on the deck of floating platform 302.

In this embodiment, the power generated from the gas turbine power generation system 710 is an adjustable supply, in which the user can control the amount of power output. The power generated from the plurality of wind turbines 304 is a fluctuating supply, in which the power generated is dependent on the amount of wind. Advantageously, a constant combined power supply may be output from this embodiment by monitoring the fluctuating supply from the plurality of wind turbines 304 and adjusting the adjustable supply from the gas turbine power generation system 710 to maintain a constant combined output power supply. The power management module 106 may be configured to manage fluctuating supply from the plurality of wind turbines and the adjustable supply from the gas turbine power generation system 710 to provide a constant combined output power supply.

The gas turbine power generation system 710 may be of any type of gas turbine power generation system. For example, it may be the Rolls-Royce Trent 60 gas turbine generation system, which may generate up to 64 MW of electrical power. Natural gas or fuel oil may be used to operate the gas turbine power generation system 710. Storage tanks 712 may be provided for storing natural gas and/or fuel oil for use in the gas turbine power generation system 710. It is understood that there may be variations in the number, disposition, and/or types of gas turbine power generation system 710 and storage tanks 712. FIG. 7 is provided by way of an example only.

The power generated by the gas turbine power generation system 710 may be transmitted to substation 308, which will consolidate the power generated from the gas turbine power generation system 710 and/or the plurality of wind turbines 304 for subsequent usage or for transmission to another location. The substation 308 may be configured to ensure a stable supply of power output. The substation 308 may also be configured to step up/down voltage for subsequent usage or for transmission to the onshore power grid. The substation 308 may include metering devices and control system for monitoring and controlling power supply from the plurality of wind turbines 304 as well as the power supply from the gas turbine power generation system 710. The substation 308 may function as the power management module 106.

In an embodiment when the output from the substation 308 is for transmission to another floating platform, the turret mooring system 306 may be configured to connect with underwater cables for transmission of power consolidated in the substation 308 to the other floating platform. Electrical power and control swivels, and electrical connectors may be included in the turret mooring system 306 to facilitate the connection of the underwater cables to the turret mooring system 306 for power transmission.

Figure 8:
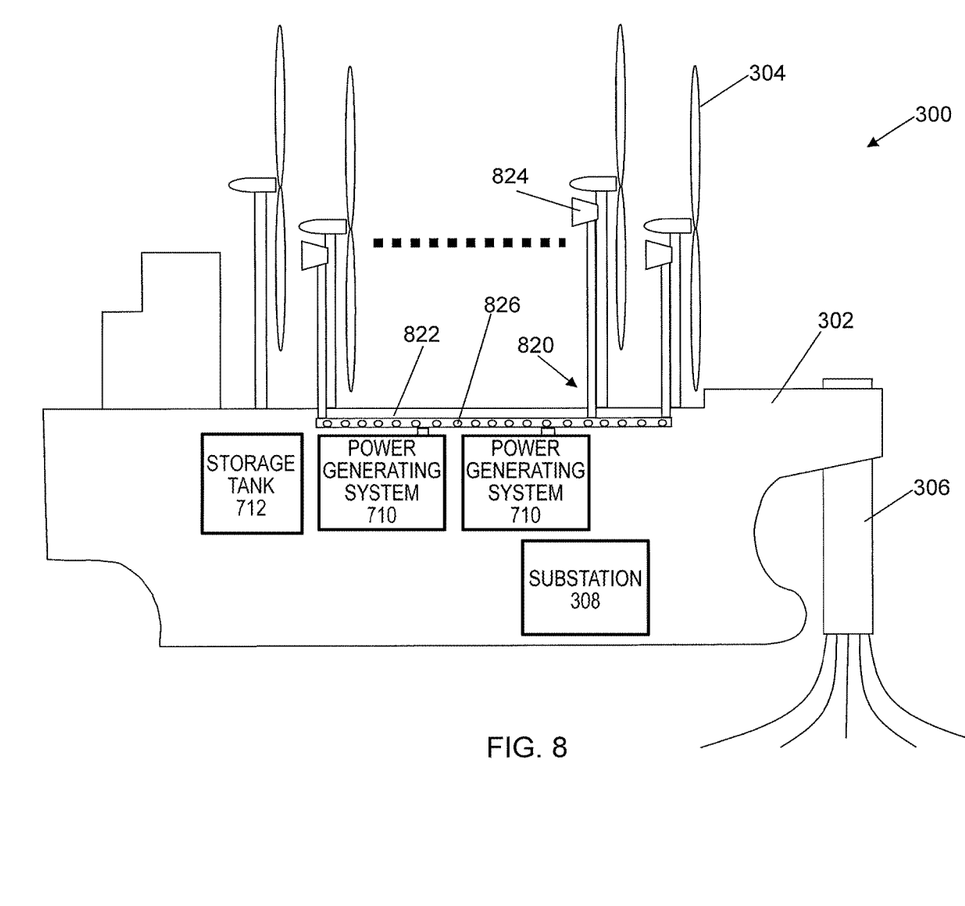

In an embodiment, the offshore facility with power generation 300 may further include an exhaust air blower system for directing the exhaust gas from the gas turbine power generation system 710 to blow into the plurality of wind turbines 304 to augment the wind power generation. FIG. 8 shows an offshore facility 300 with an exhaust air blower system 820. The exhaust air blower system 820 may include an air suction duct 822 in which ambient air is sucked into the air suction duct through perforations 826 via venturi effect as the exhaust air flows through the air suction duct 822. The suction of air allows the exhaust air to cool and increases the volume of air blowing towards the plurality of air turbines 304. The exhaust air blower system 820 may also include a blower trumpet 824 which is disposed in front of each wind turbine. As shown in FIG. 8 the blower trumpet 824 may be placed on the stem of each wind turbine. It is understood that variation in the design, disposition and configuration of the exhaust air blower system 820 may be possible. FIG. 8 is provided by way of an example.

Figure 9:
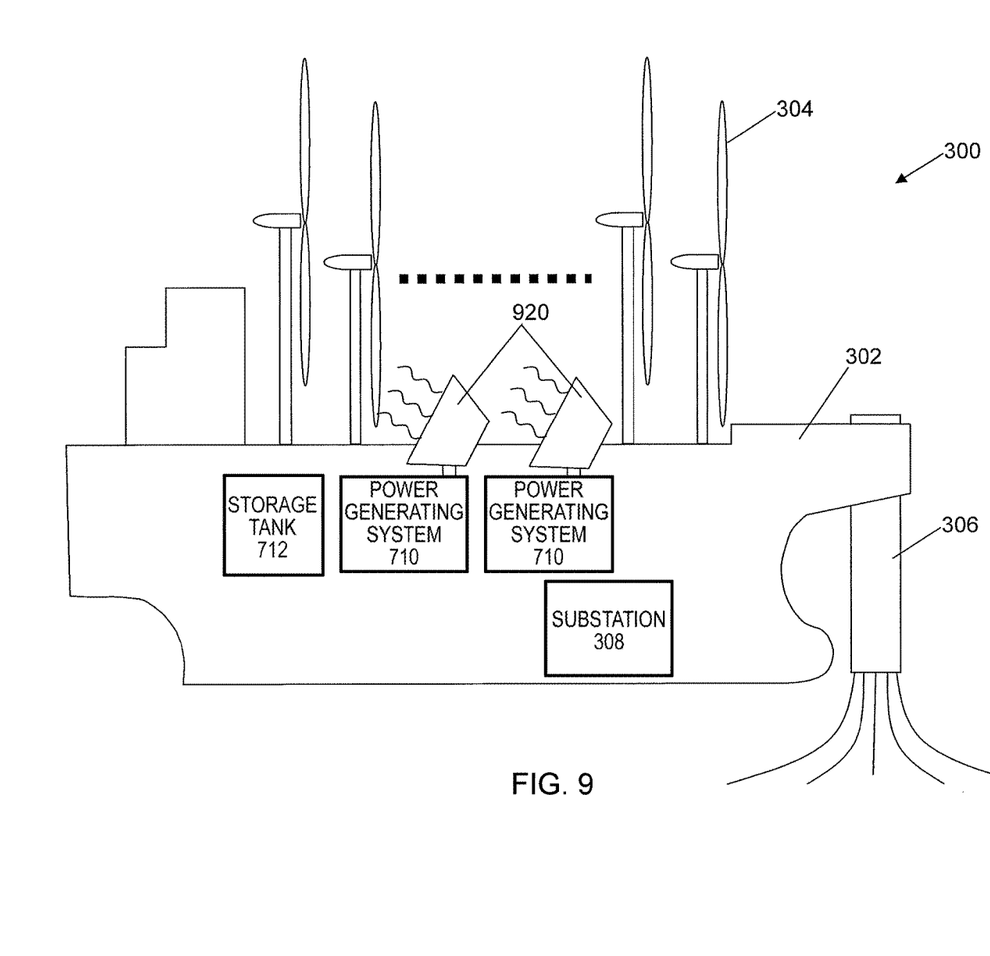

In another embodiment, the offshore facility with power generation 300 may include an exhaust duct for directly blowing the exhaust gas from the gas turbine power generation system 710 towards the plurality of wind turbines 304. FIG. 9 shows an offshore facility with power generation 300 with an exhaust duct 920 from the gas turbine power generation system 710 directing the exhaust gas towards the plurality of wind turbines 304. As can be seen, each gas turbine power generation system 710 has one exhaust duct 920 which blows exhaust gas at an angle towards the plurality of wind turbines 304. It is understood that variation in the design, disposition and configuration of the exhaust air duct 920 may be possible. FIG. 9 is provided by way of an example.

Embodiments as shown in FIG. 8 and FIG. 9 are able to use exhaust gas to augment the natural wind for power generation by the plurality of wind turbines 304. Advantageously, this may enhance the efficiency of the overall power generation system for the offshore facility with power generation 300. During periods of no wind, the plurality of wind turbines 304 may also continue to operate from the flow of exhaust air.

In an example implementation, the offshore facility with power generation 300 may include five wind turbines with 50 meter rotor blades. The wind turbines may be spaced 80 m apart. The offshore facility with power generation 300 may further include five Rolls Royce Trent 60 gas turbines. In such a system, the five wind turbines may be able to generate up to 15 MW of power and the five gas turbines may generate up to 320 MW of power. Therefore, the total power generation for such a system may be up to 335 MW. The amount of power generated may be sufficient to power up a processing plant or factory. It is understood that variation in the type of wind turbines, number of wind turbines, type of gas turbine generation system and number of gas turbines may vary. The above is provided by way of an example implementation only.

In another embodiment, the offshore facility 300 may further include storage tanks for Liquefied Natural Gas (LNG) and regasification equipment to convert LNG into natural gas for operating the gas turbine power generation system 710.

Figure 10:
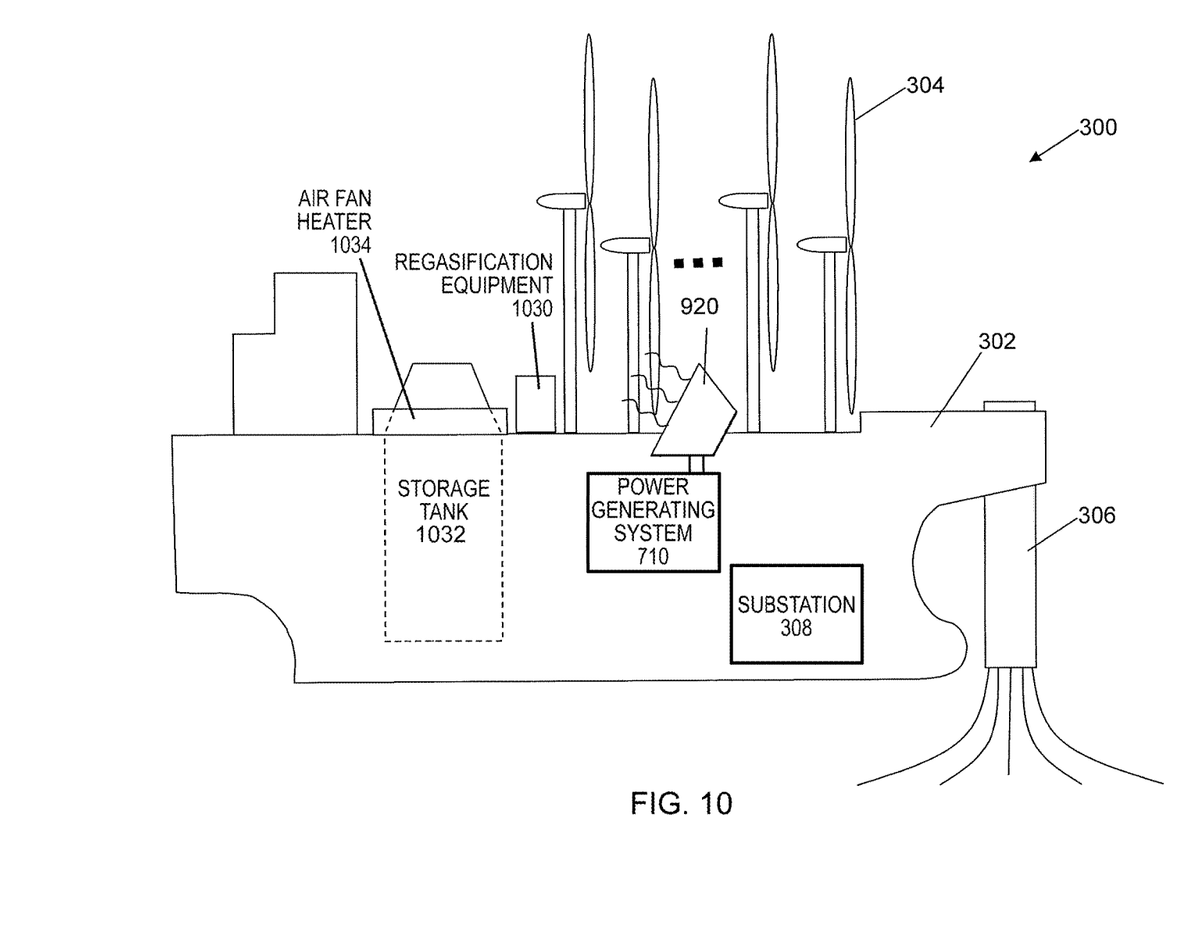
Figure 11:
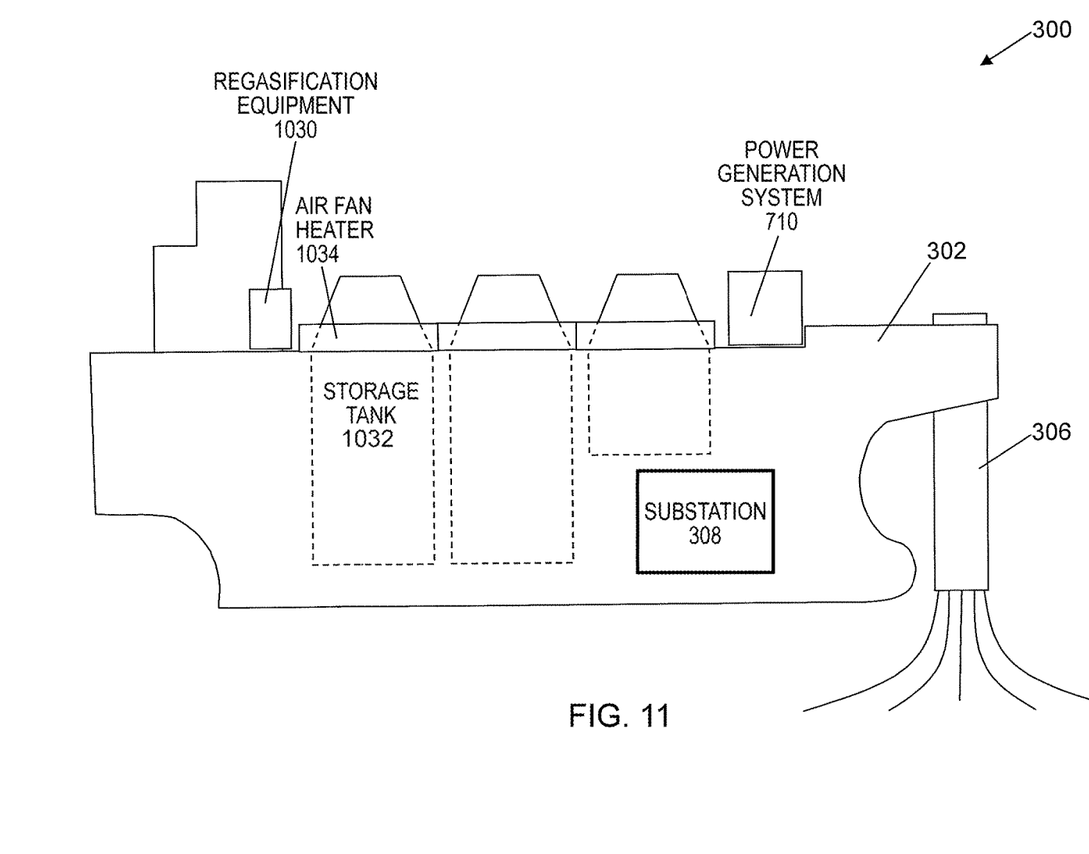

As shown in FIG. 10, the offshore facility with power generation 300 may include regasification equipment 1030 and LNG storage tank 1032 in addition to the gas turbine power generation system 710 and the plurality of wind turbines 304. As shown in FIG. 11, the offshore facility with power generation 300 may include regasification equipment 1030 and LNG storage tank 1032 in addition to the gas turbine power generation system 710 only (without the plurality of wind turbines 304). For example, the regasification equipment 1030 may include a shell and tube LNG vaporizer for heat exchange between LNG and an intermediate fluid such as glycol/water or propane or other refrigerant. The intermediate fluid may then pass through a series of air fan heaters 1034 for heat exchange between the intermediate fluid and the ambient air. It is understood that other types of regasification methods and/or equipment are possible. For example, seawater, ambient air or intermediate fluid regasification methods and/or equipment may be possible. Further, it is understood that other equipment such as unloading arms, boil off gas handling means, flare stacks, booster pumps, etc required for implementing LNG regasification on the floating platform 302 may be included.

In an example implementation, there may be one or more LNG storage tanks. The total LNG storage capacity may be 180,000 m3. Based on the average consumption of the gas turbine generation system 710, which is about 2000 m3 of LNG per day for a Rolls-Royce Trent 60 gas turbine, the gas turbine generation system 710 of the offshore facility with power generation 300 may last for about 90 days. Advantageously, the power generation facility 300 only requires loading of LNG once every 2-3 months. It is understood that variation in the number, disposition, capacity and types of the LNG storage tanks may be possible. The above is provided by way of an example.

In another embodiment, the offshore facility with power generation 300 may not require air fan heaters for the heat exchange between intermediate fluid of the shell and tube LNG vaporizer of regasification equipment 1030. The exhaust from the gas turbine generation system 710 may be directed to heat up the intermediate fluid. The exhaust temperature is typically between 400-440° C. With the intermediate fluid being heated up to this temperature, the intermediate fluid will be efficient in regasifying the LNG.

With the regasification equipment 1030, other than supplying electrical power to other floating platform, the offshore facility 300 may also supply Natural Gas to another location. The turret mooring system 306, in addition to electrical connections for supply electrical power, may also be configured with the necessary connections for supplying Natural Gas to the other location via underwater connections.

It is understood that various combinations of the systems and equipment described above may be possible for the offshore facility 300. For example, in an embodiment, the offshore facility 300 may include only the gas turbine generation system 710, the LNG storage tanks 1032 and regasification equipment 1030. In this embodiment, it is possible for the offshore facility 300 to supply both electrical power and natural gas. The offshore facility 300 may also be configured to only supply natural gas.

In another embodiment, the offshore facility 300 may only include LNG storage tanks 1032 and regasification equipment 1030. In this embodiment, the offshore facility 300 may only supply natural gas.

Advantageously, an offshore facility with power generation 300 as described above is mobile and portable, and may be located away from populated area, thus have minimal polluting effect and/or fire risks to the area where the power is supplied to. Being mobile and portable also means that the offshore facility with power generation 300 is able to be moved and located at places where there is abundance of natural wind to be harnessed. Further, in an embodiment of the offshore facility with power generation 300 with the combination of a plurality of wind turbines 304, the gas turbine generation system 710, the LNG storage tanks 1032 and regasification equipment 1030, advantageously, natural gas that has escaped from the various equipment may be dispersed by the plurality of wind turbines 304, thereby reducing the risk of explosion/fire.

Thus it can be seen that an offshore facility has been provided which may eliminate the problems of land-based power generation and metal processing plants.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. An offshore facility comprising:
   a floating platform;
   a metal processing apparatus disposed on the floating platform;
   a power generation system adapted to supply power to the metal processing apparatus;
   a power management module and a substation for consolidating and distributing a power output from the power generation system, wherein the power generation system comprises a combination of a plurality of wind turbines and at least one gas turbine generator; and
   an exhaust air blower system for directing an exhaust gas from the gas turbine generator towards the plurality of wind turbines, the exhaust air blower system comprising:
   an air suction duct configured to draw ambient air into a flow of the exhaust gas through perforations via venturi effect as the exhaust gas flows through the air suction duct; and
   a blower trumpet disposed in front of each wind turbine and fluidly connected to the air suction duct.

2. The offshore facility as claimed in claim 1, further comprising a liquefied natural gas (LNG) regasification system.

3. The offshore facility as claimed in claim 2, wherein the LNG regasification system comprises a shell and tube vaporizer for heat exchange between the LNG and an intermediate fluid.

4. The offshore facility as claimed in claim 3, wherein the LNG regasification system further comprises a plurality of air fan heaters for heat exchange between the intermediate fluid and ambient air.

5. The offshore facility as claimed in claim 2, wherein the exhaust gas from the gas turbine generator is directed to the intermediate fluid for heat exchange between the exhaust and the intermediate fluid.

6. The offshore facility as claimed in claim 1, further comprising a mooring system.

7. The offshore facility as claimed in claim 6, wherein the mooring system is configured to transmit electrical power from the offshore facility to another location.

8. The offshore facility as claimed in claim 7, wherein the mooring system is further configured to supply gas to another location.

9. The offshore facility as claimed in claim 6, wherein the mooring system is a turret mooring system.

10. The offshore facility as claimed claim 1, wherein the metal processing apparatus is adapted to melt the metal.

* * * * *